United States Patent
Komarla et al.

(10) Patent No.: US 10,439,897 B1
(45) Date of Patent: Oct. 8, 2019

(54) METHOD AND APPARATUS FOR ENABLING CUSTOMIZED CONTROL TO APPLICATIONS AND USERS USING SMART TAGS

(71) Applicant: EMC IP Holding Company LLC, Hopkinton, MA (US)

(72) Inventors: Eshwari Prasad Komarla, Bangalore (IN); Umamaheshwar Hegde, Bangalore (IN); Christopher A. Chaulk, Franklin, MA (US); Afzal Rahman Jan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 408 days.

(21) Appl. No.: 13/803,849

(22) Filed: Mar. 14, 2013

(51) Int. Cl.
*G06F 15/00* (2006.01)
*G06F 17/30* (2006.01)
*G06F 15/16* (2006.01)
*H04L 12/24* (2006.01)

(52) U.S. Cl.
CPC ................................. *H04L 41/50* (2013.01)

(58) Field of Classification Search
CPC . H04L 67/22; H04L 12/2615; H04L 12/2642; H04L 2012/5631; H04L 2012/5636; G06F 12/0846; G06F 3/0631; G06F 3/1224
USPC ........................................................ 709/223
See application file for complete search history.

(56) References Cited

U.S. PATENT DOCUMENTS

| | | | | |
|---|---|---|---|---|
| 6,148,335 A * | 11/2000 | Haggard | ................. | H04L 41/22 709/224 |
| 6,189,036 B1 * | 2/2001 | Kao | ........................ | G06F 9/468 709/225 |
| 6,966,033 B1 * | 11/2005 | Gasser | .................... | H04L 41/22 715/738 |
| 7,003,522 B1 * | 2/2006 | Reynar | ................. | G06F 16/986 707/736 |
| 7,251,689 B2 * | 7/2007 | Wesley | .................... | H04L 29/06 709/200 |
| 7,673,324 B2 * | 3/2010 | Tirosh | .................... | G06F 21/556 726/1 |
| 7,814,491 B1 * | 10/2010 | Chen | .................... | G06F 9/5016 709/226 |
| 9,112,777 B1 * | 8/2015 | Barclay | ............... | H04L 41/0803 |
| 2007/0226077 A1 * | 9/2007 | Frank | ....................... | G06N 5/02 705/26.64 |
| 2009/0077107 A1 * | 3/2009 | Scumniotales | .... | G06Q 10/0637 |
| 2009/0249460 A1 * | 10/2009 | Fitzgerald | ............... | G06F 21/88 726/7 |

(Continued)

*Primary Examiner* — Kevin T Bates
*Assistant Examiner* — Golam Mahmud
(74) *Attorney, Agent, or Firm* — Ryan, Mason & Lewis, LLP

(57) ABSTRACT

Example embodiments of the present invention provide a method, an apparatus, and a computer program product for tagging storage resource management objects in a storage resource management application. The method includes receiving an identification of a storage resource management object in the storage resource management application and associating a tag with the identified storage resource management object. The storage resource management application then may perform an operation on the storage resource management object according to the tag.

21 Claims, 16 Drawing Sheets

(56) References Cited

U.S. PATENT DOCUMENTS

| | | | |
|---|---|---|---|
| 2011/0029533 A1* | 2/2011 | Jayakody | G06F 16/907 707/738 |
| 2011/0086625 A1* | 4/2011 | Inlow | H04M 3/42153 455/418 |
| 2012/0102543 A1* | 4/2012 | Kohli | H04L 63/20 726/1 |
| 2013/0166550 A1* | 6/2013 | Buchmann | G06F 16/907 707/736 |
| 2013/0170400 A1* | 7/2013 | Koehler, Jr. | H04L 12/4645 370/255 |

* cited by examiner

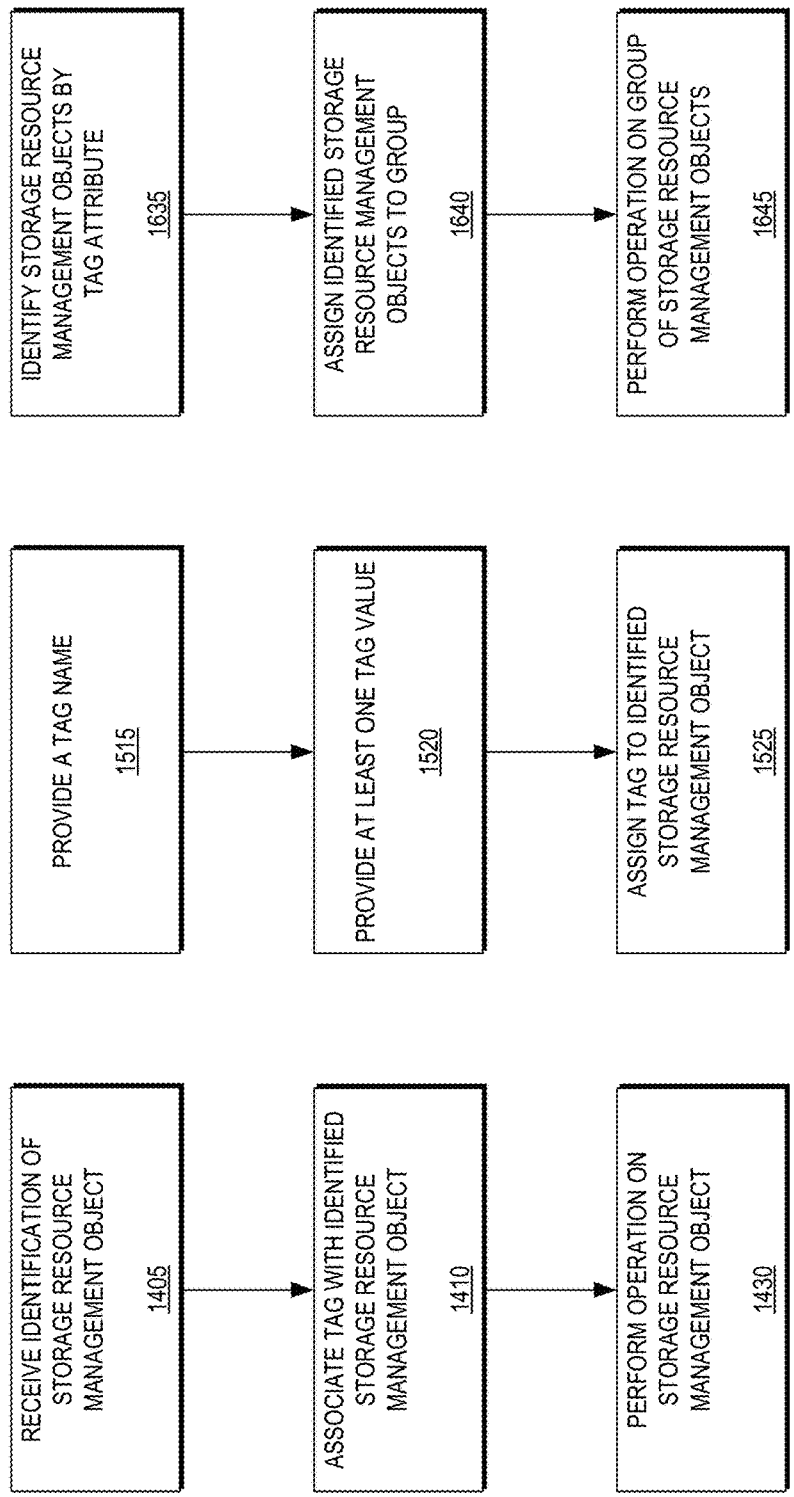

METHOD AND APPARATUS FOR ENABLING CUSTOMIZED CONTROL TO APPLICATIONS AND USERS USING SMART TAGS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to storage resource management.

BACKGROUND

Storage resource management applications, like ProSphere® by EMC Corporation of Hopkinton, Mass., manage storage infrastructure, including hosts, switches, fabrics, and arrays. The storage resource management application may discover the network infrastructure (i.e., all the devices in the network, such as based on a range of Internet protocol (IP) addresses). Devices and their interconnections may be discovered and stored in a repository. Once the network is discovered, the storage resource management application may be used to monitor for alerts, do performance analysis, capacity reporting, etc. The storage resource management application may collect details about the objects as they are discovered. These details vary from type of the device/object being discovered; for example, in the case of a host device, the following attributes may be collected: host name, operating system, IP address, host bus adapter (HBA) details, etc. Users can use the storage resource management application to search and review the details of the objects once they are discovered.

SUMMARY

Example embodiments of the present invention provide a method, an apparatus, and a computer program product for tagging storage resource management objects in a storage resource management application. The method includes receiving an identification of a storage resource management object in the storage resource management application and associating a tag with the identified storage resource management object. The storage resource management application then may perform an operation on the storage resource management object according to the tag.

BRIEF DESCRIPTION OF THE DRAWINGS

The above and further advantages of the present invention may be better under stood by referring to the following description taken into conjunction with the accompanying drawings in which:

FIG. 14 is a flow diagram illustrating a method for performing operations on storage resource management objects according to tags applied to the storage resource management objects according to an example embodiment of the present invention;

FIG. 15 is a flow diagram illustrating a method for assigning a tag to an identified storage resource management object according to an example embodiment of the present invention;

FIG. 16 is a flow diagram illustrating a method for performing an operation on a group of storage resource management objects according to tags applied to the storage resource management objects according to an example embodiment of the present invention;

DETAILED DESCRIPTION

Traditional file systems, operating systems, system management applications, and storage resource management applications do not support the use of tags and intelligent use of these tags; rather, few attributes of objects are predefined. Example embodiments of the present invention overcome these and other shortcomings by providing flexibility to create user-defined tags and customized control to tags for making decisions based on tags a user has created. Accordingly, in example embodiments of the present invention, tags may provide greater control to the user on the object according to their values, such as by providing greater control to the user on how policies are applied to individual objects to meet unique specific needs.

Figure 1:
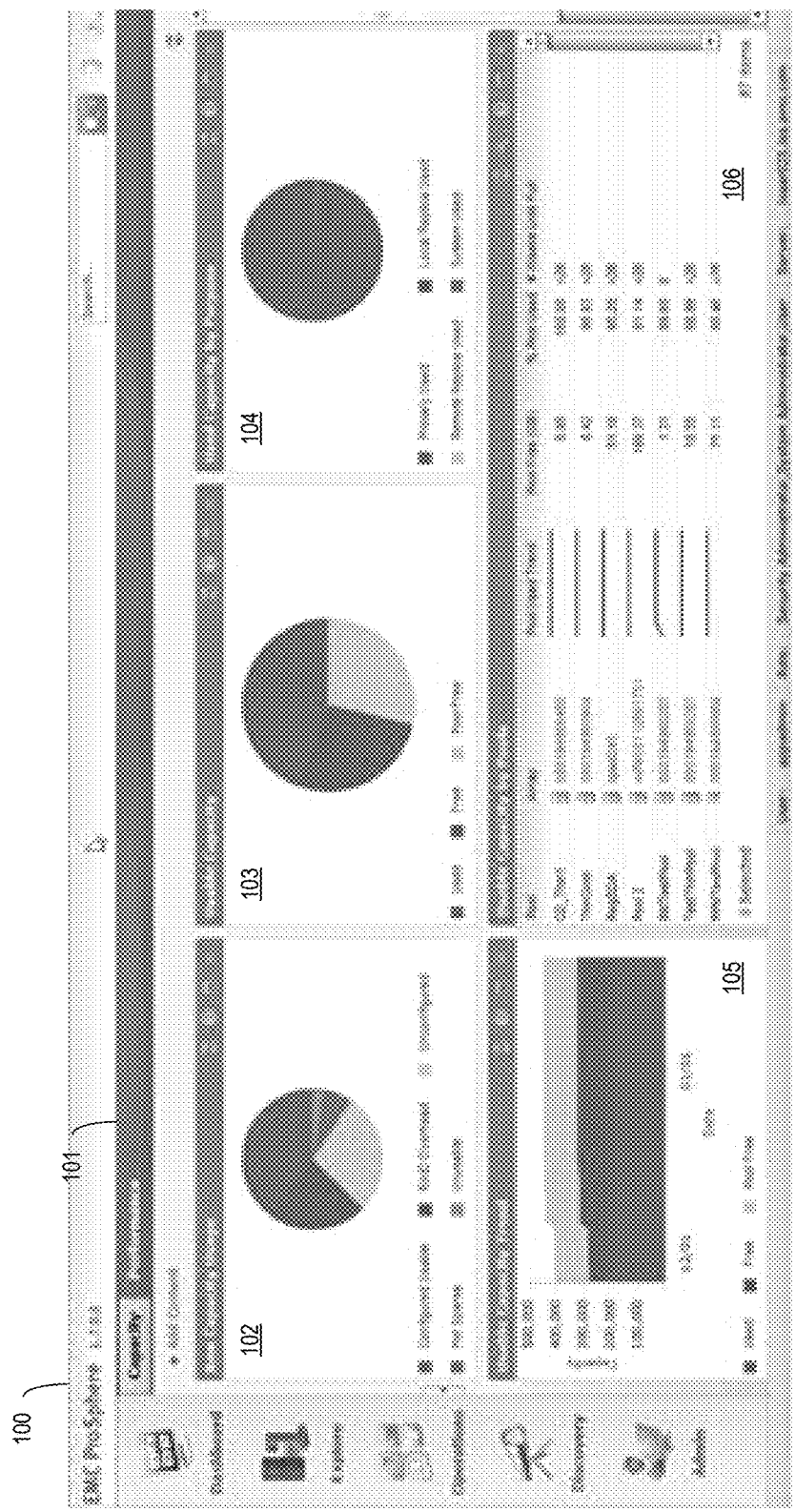
FIG. 1 is a screen shot of a storage resource management application according to an example embodiment of the present invention.

FIG. 1 is a screen shot of a storage resource management application 100, such as ProSphere® by EMC Corporation of Hopkinton, Mass., according to an example embodiment of the present invention. The storage resource management application 100 may provide a workspace 101 defining a plurality of apps 102-106 for management of storage resource management objects. Storage resource management applications using such tags, in particular, may provide users greater control and customization over objects discovered in the application, and the ability to interact with other applications like performance, capacity, and backup/restore applications, and for those applications to be fine-tuned to each individual object. In the case of a storage resource management application, there may be various objects in a data center (e.g., host, switch, port, array, logical unit (LU)). These storage resource management objects may be discovered by the storage resource management object.

Figure 2:
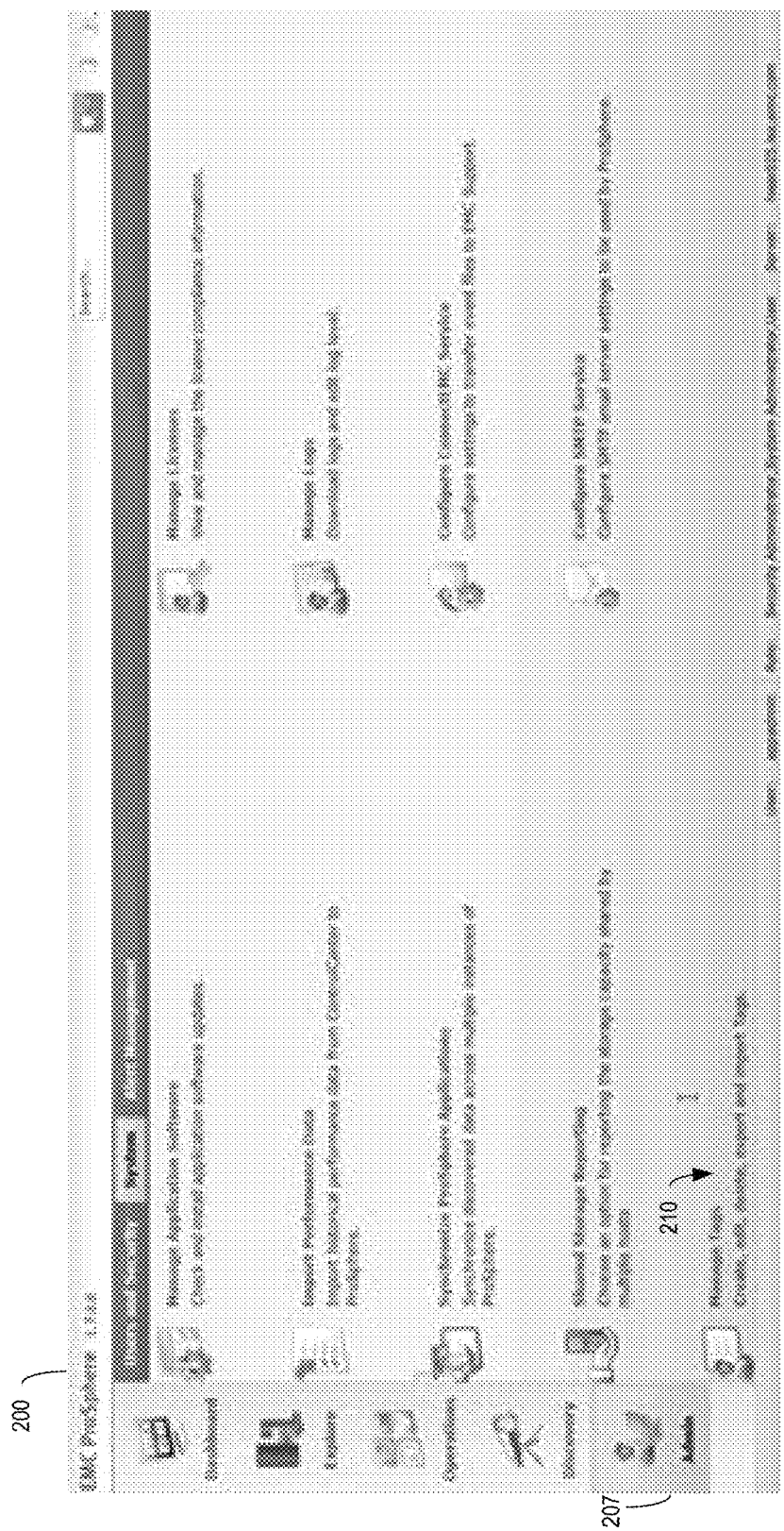
FIG. 2 is a screen shot of a system administration pane of a storage resource management application providing tag management according to an example embodiment of the present invention.

FIG. 2 is a screen shot of a system administration pane 207 of a storage resource management application 200 providing tag management 210 according to an example embodiment of the present invention. According to example embodiments of the present invention, tags may be associated with respective objects. These tags may be used by the storage resource management application to group storage resource management objects by attributes, characteristics, and/or properties. For example, storage resource management objects may be tagged (and subsequently grouped) according to static attributes (e.g., operating system) and/or dynamic attributes (e.g., Internet protocol (IP) address).

Figure 3:
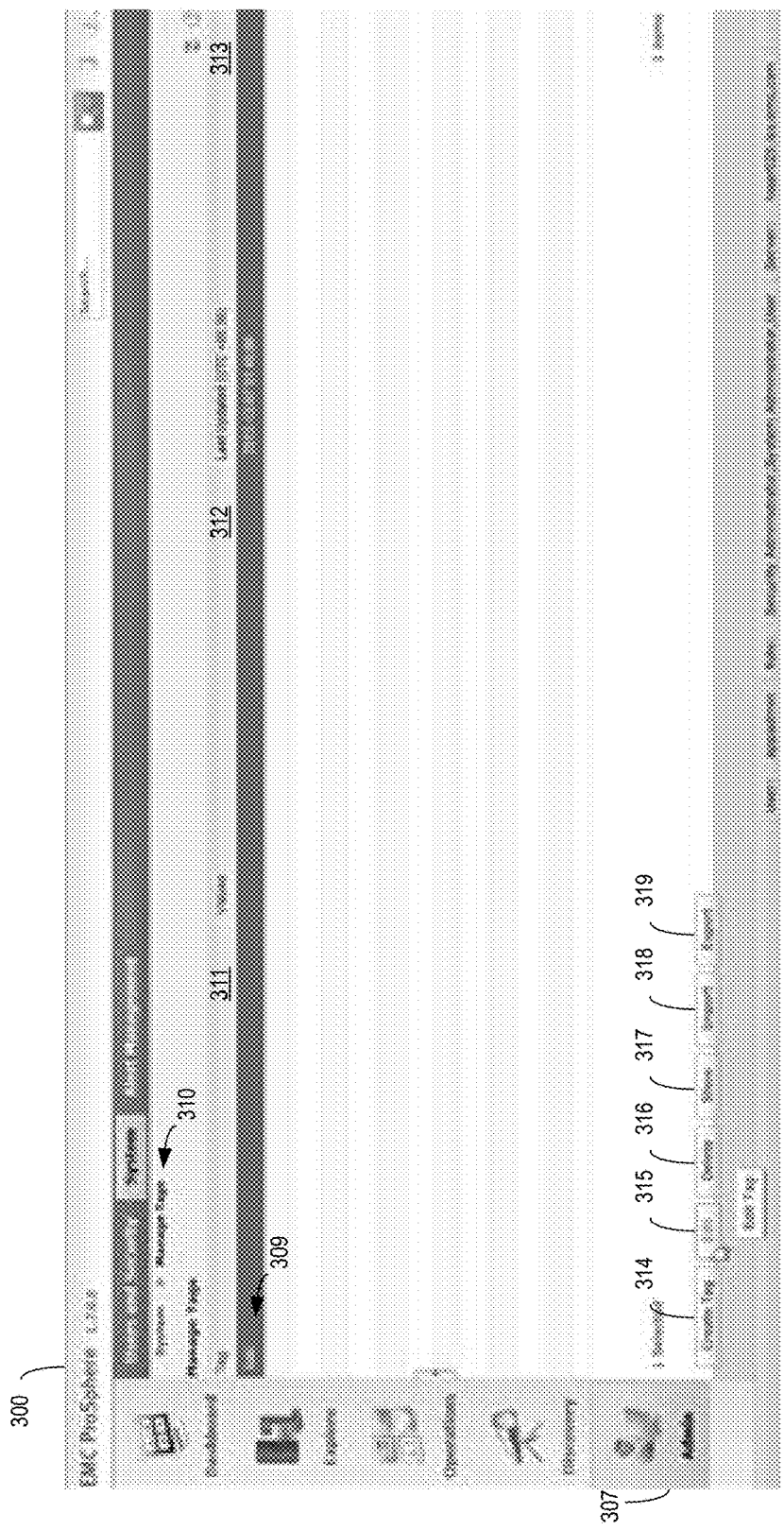
FIG. 3 is a screen shot of a tag management screen of a system administration pane of a storage resource management application according to an example embodiment of the present invention.

FIG. 3 is a screen shot of a tag management screen 310 of a system administration pane 307 of a storage resource management application 300 according to an example embodiment of the present invention. As illustrated in FIG. 3, the tag management pane 310 showing tags 309 and tag attributes, including tag name 311, tag values 312, and tag update date and time information 313. As will be described in greater detail below, each object (e.g., storage resource management object) may be associated with one or more tags 309. Tags may allow searching, filtering, grouping, and performing management operations on storage resource management objects.

As illustrated in FIG. 3, the tag management screen 310 provides tag management functions, such as "Create Tag" 314, "Edit" tag 315, "Delete" tag 316, and "Show" tag properties 317. It should be understood that many storage resource management application users maintain spreadsheets with asset management information (e.g., lease number for array, lease time period, location, tile number in lab, lab location, administrator). Accordingly, example embodiments of the present invention provide an interface (e.g., application programming interface (API) or user interface (UI)) for input and output of storage resource management object data and tag data. For example, this information entered by a user in the spreadsheet may be exported, such as in a comma separated value (CSV) file, and imported 318 into the storage resource management application 300. In other embodiments, the storage resource management object data in the storage resource management application 300 may be exported 319 for other use, such as in the spreadsheets as mentioned above.

Figure 4:
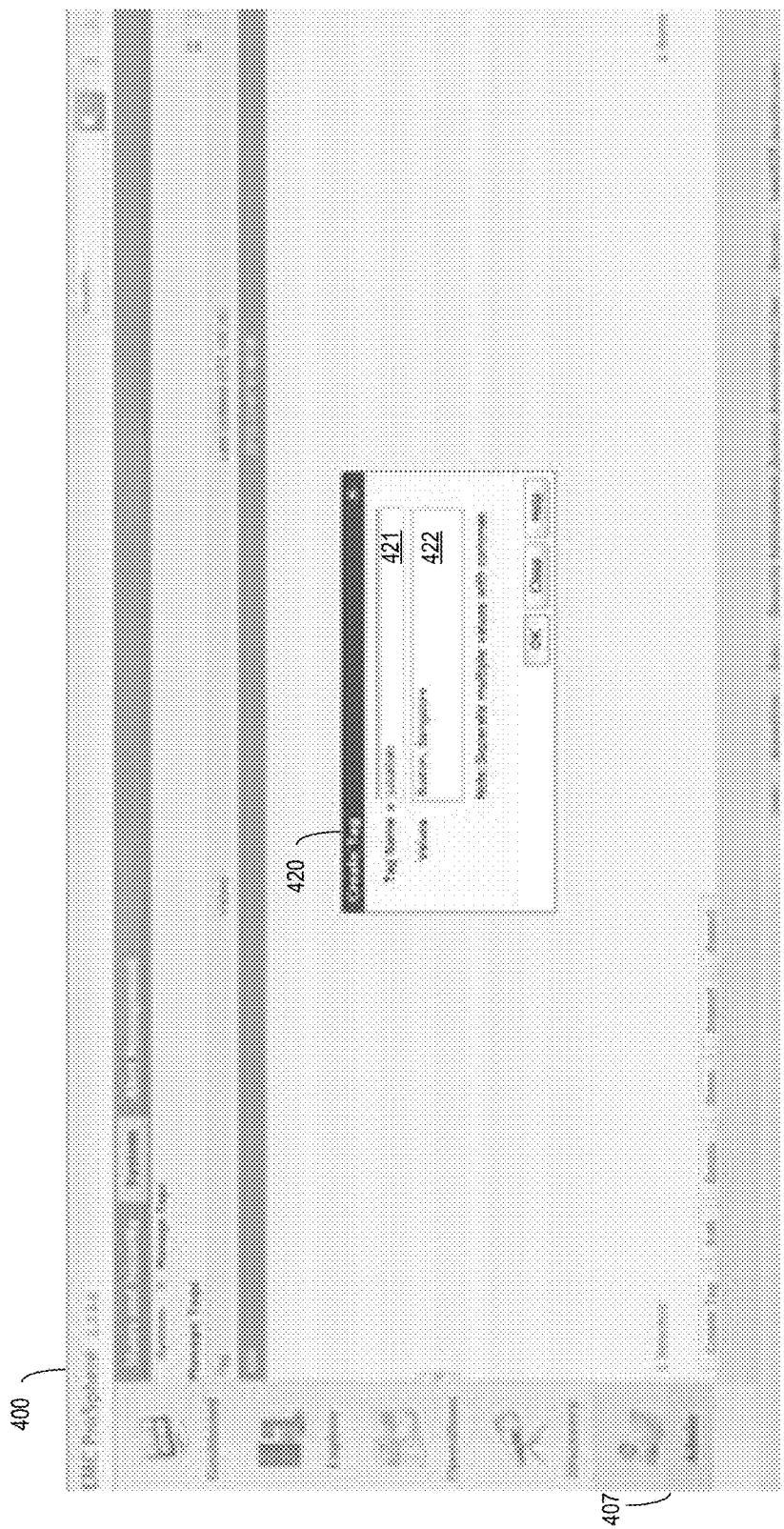
FIG. 4 is a screen shot of a tag creation screen of a system administration pane of a storage resource management application according to an example embodiment of the present invention.

FIGS. 4-13 are screen shots of a storage resource management application according to example embodiments of the present invention. The screen shots of FIGS. 4-13 may be studied in conjunction with FIG. 14-16, which are flow diagrams illustrating methods according to example embodiments of the present invention FIG. 4 is a screen shot of a tag creation screen 420 of a system administration pane 407 of a storage resource management application 400 according to an example embodiment of the present invention. Tags are different from the system/static properties that are created with the object, such as file name, date of creation, permissions, etc. There are two parts to a tag: (1) the tag name; and (2) the tag value. As illustrated in FIG. 4, to create a tag 420, the storage resource management application user may provide a tag name 421 (1515). In certain embodiments, the storage resource management application user also may provide one or more tag values 422 (1520). It should be understood that a tag may be created without any value associated with it.

In certain embodiments, a tag may be a property field associated with the object and may be created by a user "on-the-fly" (i.e., at any time during the life of an object). A tag may be considered as a "bookmark" or an easy to remember attribute of the object. In certain embodiments, the tag may have meaning only to the user (i.e., the storage resource management application user). The tag may be free-flowing text created by the user (e.g., alphanumeric, special characters). As illustrated in FIG. 4, a tag named 421 "Location" is being created with possible values 422 of "Boston" and "Bangalore." It should be understood that tags may be value tags or non-value tags. A value tag may be an attribute of the object, such as its location (e.g., Boston or Bangalore). A non-value tag may be text not necessarily associated with an attribute of the object, such as a user's name.

Figure 5:
FIG. 5 is a screen shot of an object list of a discovery pane of a storage resource management application according to an example embodiment of the present invention.

FIG. 5 is a screen shot of an object list 530 of a discovery pane 508 of a storage resource management application 500 according to an example embodiment of the present invention. As illustrated in FIG. 5, the object list 530 includes a list of arrays 532. However, it should be understood that switches, fabrics, and hosts also may be shown. The object list 530 allows a storage resource management application user to provide an identification (i.e., select, such as via a mouse click) of a storage resource management object 531. Such a selection may cause the storage resource management application to display an object configuration pane, such as the object configuration pane 640 shown in FIG. 6.

Figure 6:
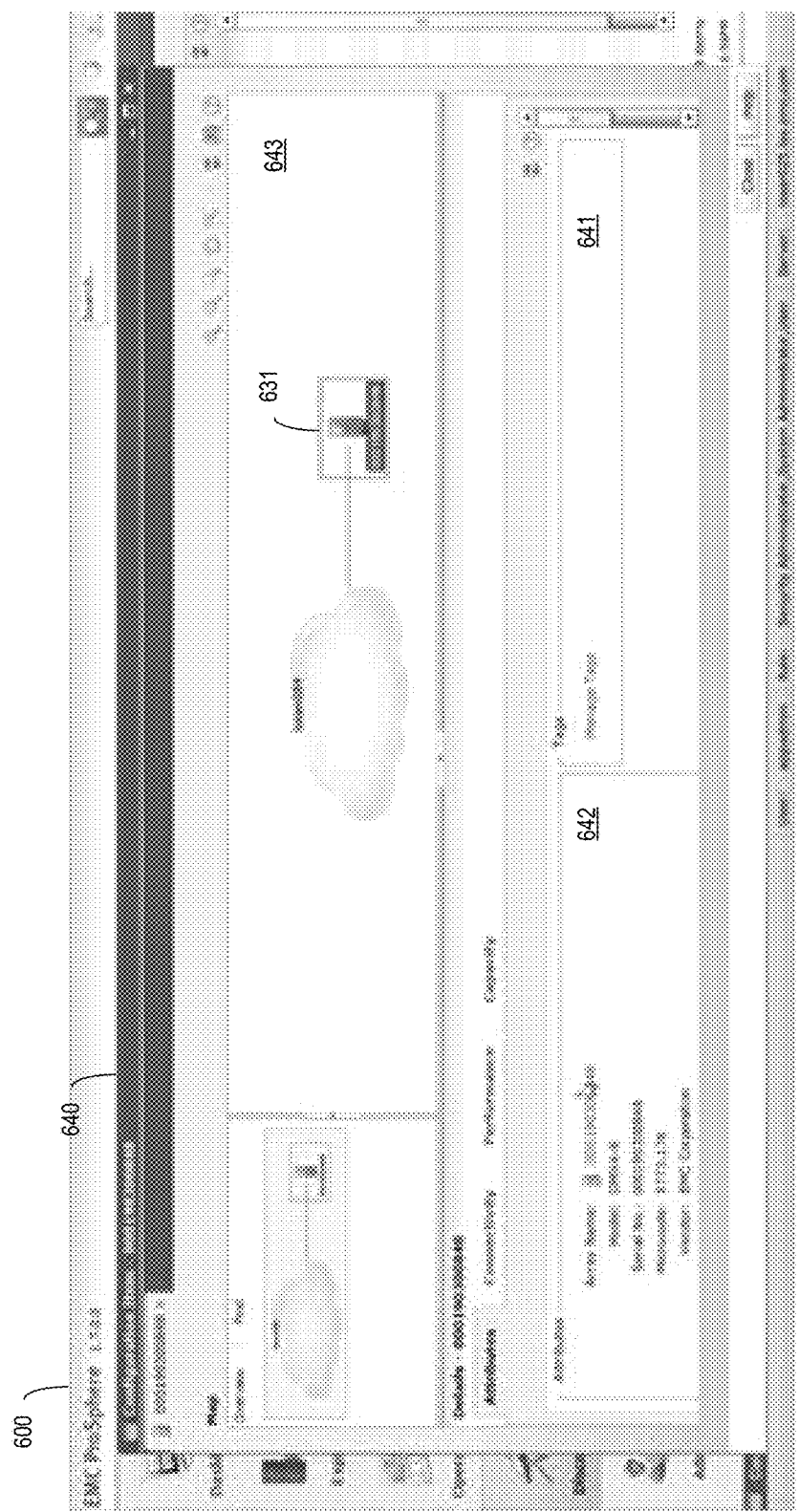
FIG. 6 is a screen shot of an object configuration pane in a storage resource management application according to an example embodiment of the present invention.

FIG. 6 is a screen shot of an object configuration pane 640 in a storage resource management application 600 according to an example embodiment of the present invention. As illustrated in FIG. 6, the object configuration pane may receive an identification of a storage resource management object 631 (1405) and provide object 631 configuration information associated with the selected object (e.g., object 531 of FIG. 5). For example, the object configuration pane 640 may provide a network topology map 643 showing the selected storage resource management object 631. Additionally, the object configuration pane 640 may display a plurality of attributes 642 of the object, such as an array name, model number, serial number, and vendor. The object configuration pane 640 also may provide a tag management portion 641 to manage (i.e., associate) tags with the selected object 631.

Figure 7:
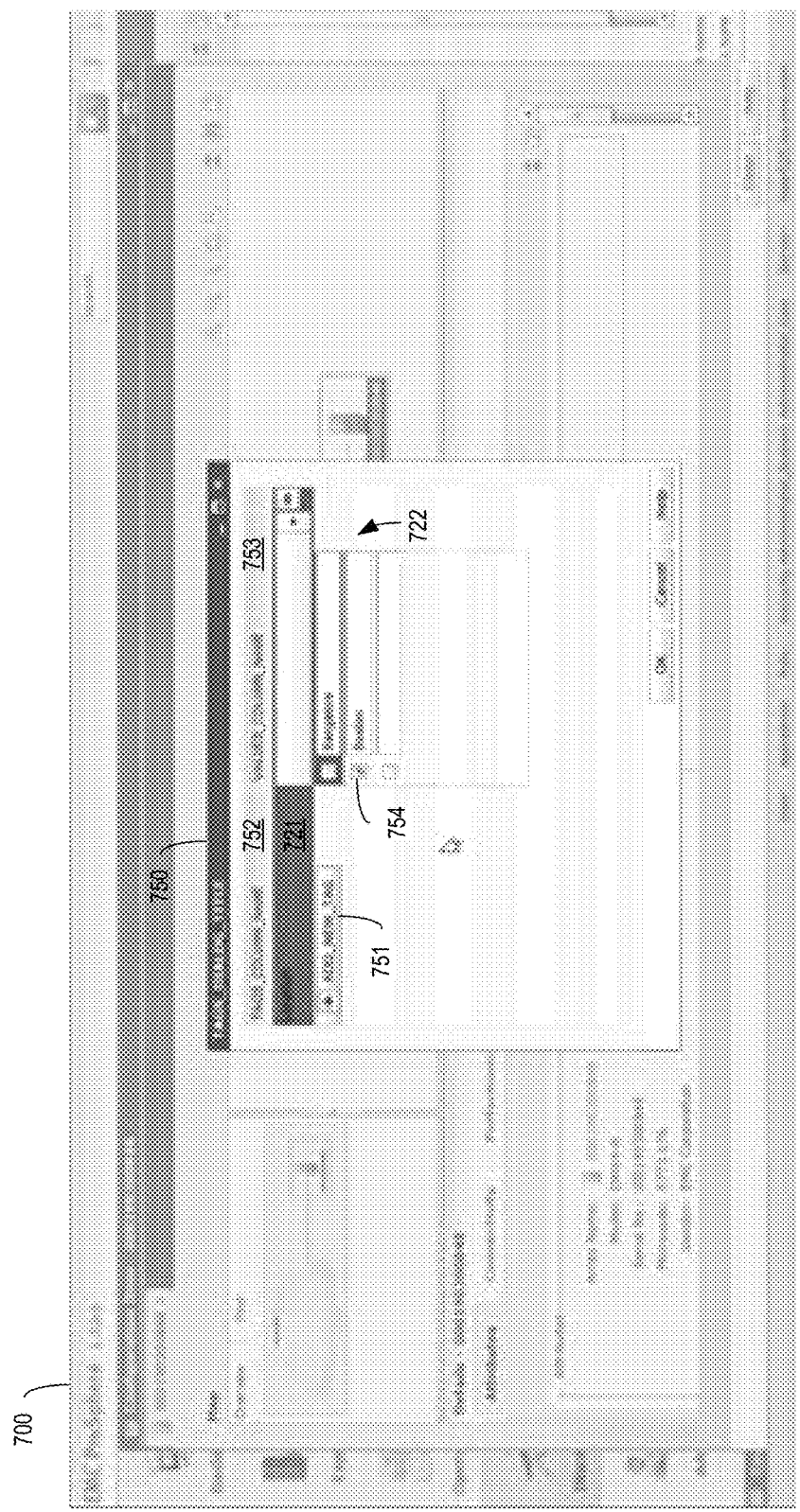
FIG. 7 is a screen shot of a tag management pane for an object in a storage resource management application according to an example embodiment of the present invention.

FIG. 7 is a screen shot of a tag management pane 750 for an object (e.g., object 531 of FIG. 5) in a storage resource management application 700 according to an example embodiment of the present invention. As illustrated in FIG. 7, the tag management pane 750 may list tag names 752 and their values 753 already associated with the selected object. For example, as illustrated in FIG. 7, the tag "Location" 721 is associated with the selection object, with the tag value 722 "Boston" selected. The tag values 722 associated with the tagged object may be adjusted, such as via a check box 754. Additionally, new tags 751 may be added to associate the tag with the identified storage resource management object (e.g., object 631 of FIG. 6) (1410), with tag values associated with the newly added tag being selected, as necessary, such as via check boxes 754 to assign the tag to the identified storage resource management object (1525).

With the tag associated with the object, example embodiments of the present invention may perform operations on the storage resource management object (1430). For illustrative purposes, consider the following examples:

Backup application: A tag may be used as a directive to select/deselect the object for backup or not. For example, if there is a tag called BACKUP with a value YES, then the backup application could use this directive to backup this file/object. If the value is NO, then the object is not backed up. This gives an additional control to the user on what objects to be backed up or not. There could be scenarios where some files need not be backed-up and they could be marked as BACKUP=NO.

Storage resource management: In an application like ProSphere, if a user would like to turn-off performance gathering for an object, the user could create a tag, such as PERFORMANCE_COLLECTION=NO. Accordingly, the performance collector in ProSphere may evaluate the tag and determine that the user has overridden the performance data collection on this object and, therefore, ignores this object. As a result, the user gets additional control over objects on how the global policies are applied or not.

Grouping: In an application like ProSphere, an object may be chosen to be grouped or not. The grouping logic may evaluate the tag and, accordingly, group the object and subject it to group operations. For example. GROUP_OPERATIONS=YES (group operations supported), GROUP_OPERATIONS=NO (group operations not supported).

Cloud: In a Cloud environment, it is common to see multiple federated data centers (i.e., connected together and managed from a central location). A system administrator can see and manage a remote data center object. Some data center elements may be local to that site and need not be federated. For example, certain sensitive servers (based on the type/nature of applications running) could be local to the site and they are managed locally; such servers can be part of the data center, still they are not federated. Tags can play a role here. By having a tag such as Federation=YES (object will be visible globally), Federation=NO (Object will not be visible outside of the local site). This use case give additional control to the user. Federation of objects and ability to manage from a central location is expensive as the data has to be replicated and consistency to be maintained across sites. By turning off federation for unwanted objects, overall performance of the system will be improved, resources (such as memory and disk space) will be optimized.

Data center: In a data center, it is common to see global policies applied to all servers. Tags may be used to give finer control to a user on how such global policies are applied at an individual server level. For a server running a critical application for which performance degradation due to a power optimization policy would be detrimental, a user could create a tag Power_Optimization=NO (power optimization policy turned off to this server), Power_Optimization=YES (power optimization policy applicable to this server). Based on the value of this tag, global policies are applied at a device/server level.

Figure 8:
FIG. 8 is a screen shot of a tag management pane of a storage resource management application showing tags and values according to an example embodiment of the present invention.

FIG. 8 is a screen shot of a tag management screen 810 of a system administration pane 807 of a storage resource management application 800 showing tags 821 and values 822 according to an example embodiment of the present invention. The tag management screen 810 may list tags by tag name 811, tag values 812, and tag update date and time information 813. As illustrated in FIG. 8, the tag management screen 810 may show the newly created tag (e.g., the tag "Location" 721 created in FIG. 7). Additionally, the tag management screen 810 provides a "Show" 817 button to view objects associated with the selected tag 821, as will be described in greater detail with respect to FIG. 9.

Figure 9:
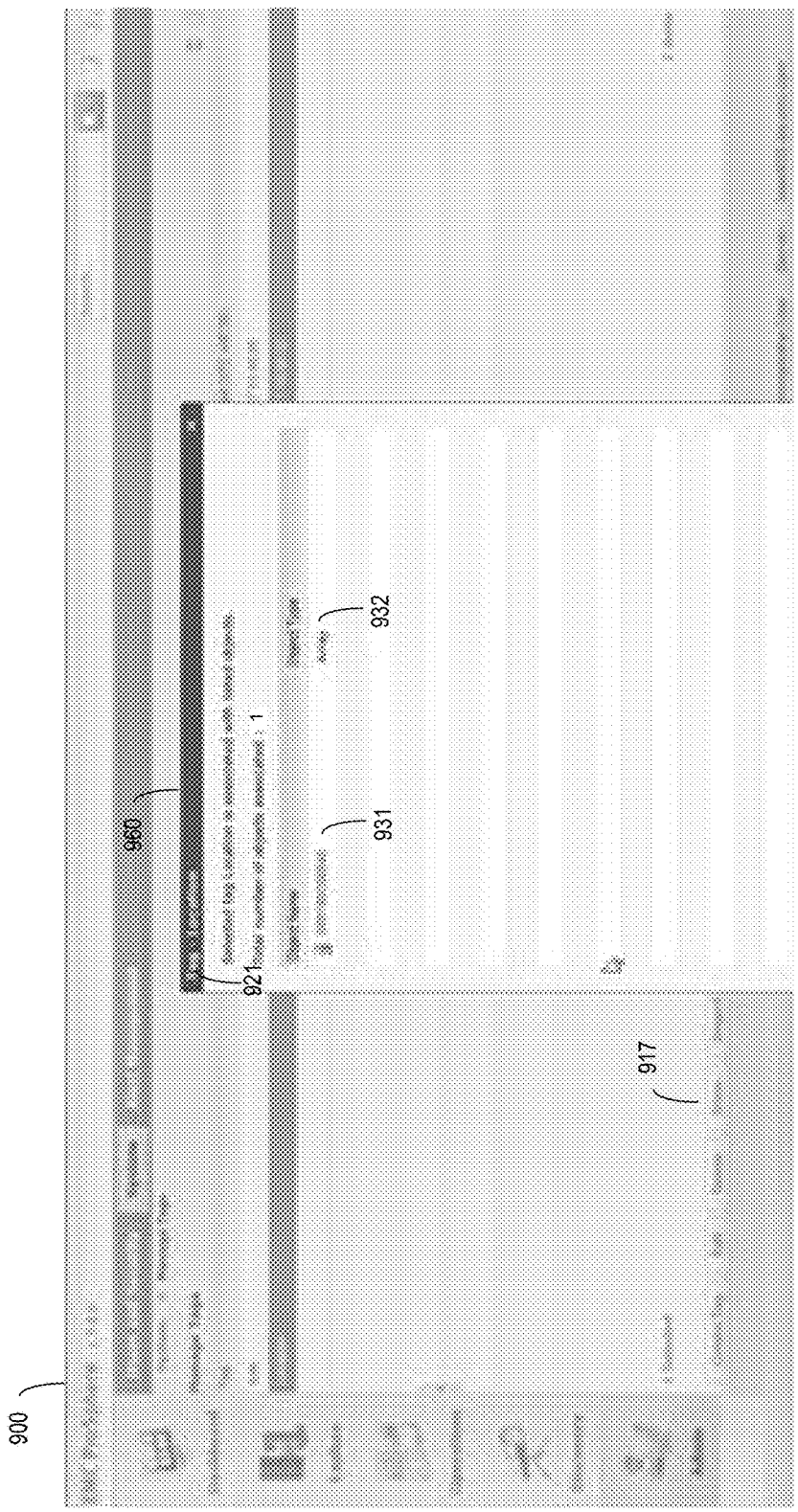
FIG. 9 is a screen shot of an object list of a storage resource management application showing objects having a selected tag according to an example embodiment of the present invention.

FIG. 9 is a screen shot of an object list 960 of a storage resource management application 900 showing object names 931 (and their types 932) having a selected tag according to an example embodiment of the present invention. As illustrated in FIG. 9, after selecting the "Show" button 917, as described above with respect to FIG. 8, the object list 960 shows the object 931 tagged with the selected tag (e.g., location 921) and its object type 932 (e.g., array).

Figure 10:
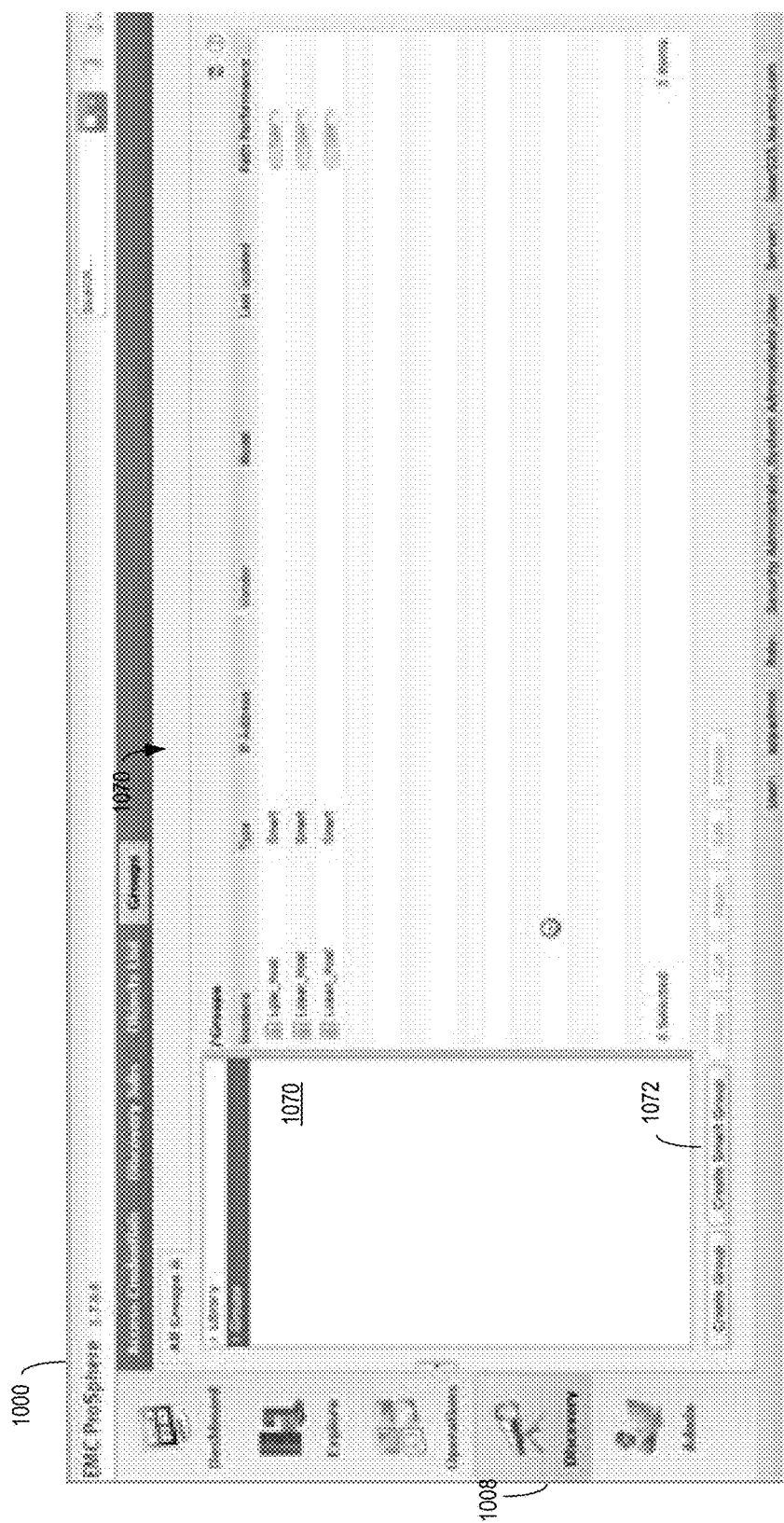
FIG. 10 is a screen shot of an object group management screen of a discovery pane of a storage resource management application providing group creation by tag according to an example embodiment of the present invention.

FIG. 10 is a screen shot of an object group management screen 1070 of a discovery pane 1008 of a storage resource management application 1000 providing group creation by tag according to an example embodiment of the present invention. As illustrated in FIG. 10, a groups panel 1070 may provide a list of available groups. The object group management screen 1070 also provide a button, "Create Smart Group" 1072, to create groups of storage resource management objects according to tags.

Figure 11:
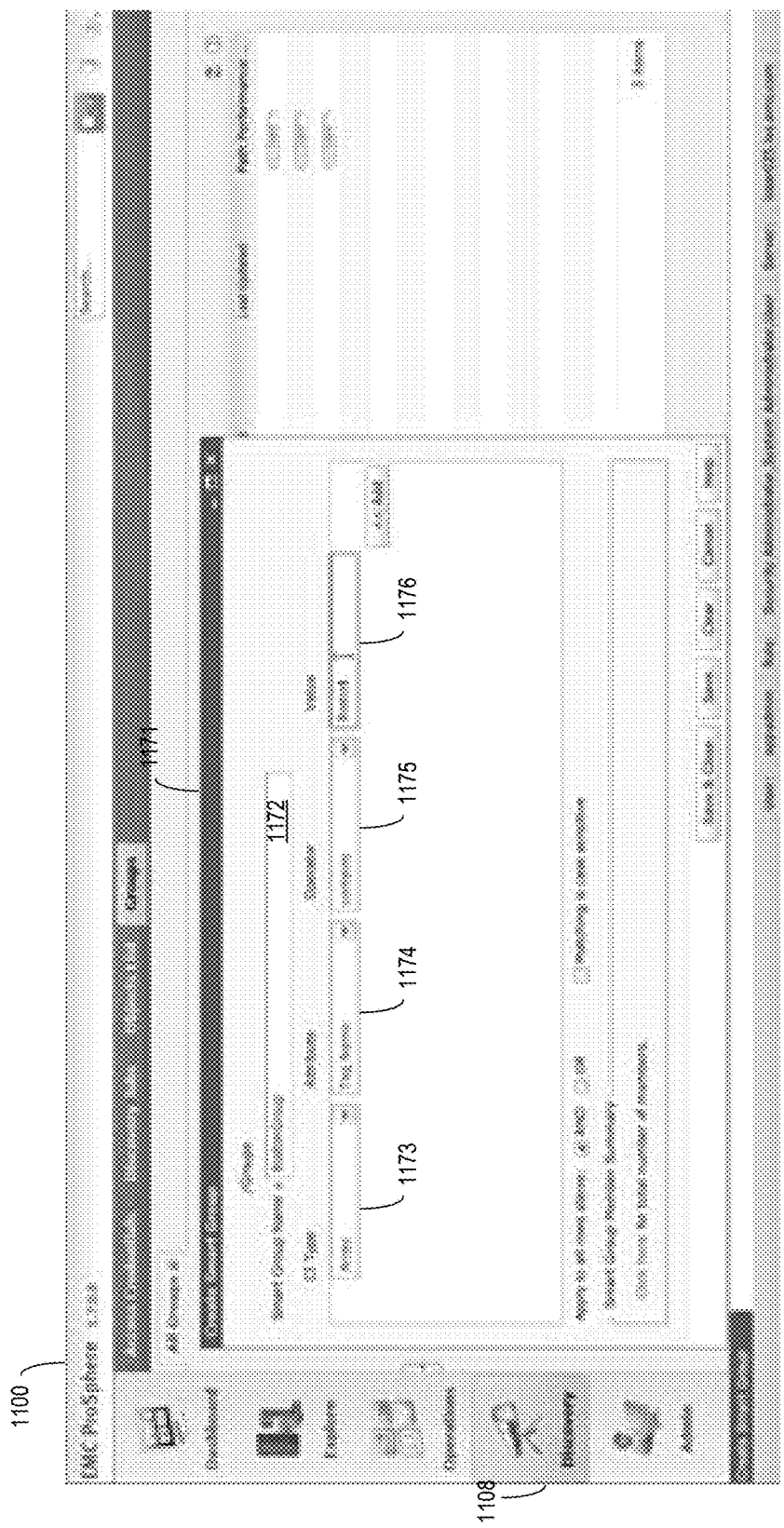
FIG. 11 is a screen shot of an object group creation screen of a discovery pane of a storage resource management application according to an example embodiment of the present invention.

FIG. 11 is a screen shot of an object group creation screen 1171 of a discovery pane 1108 of a storage resource management application 1100 according to an example embodiment of the present invention. Tags may be useful to perform intelligent operations on a set of objects like searching, filtering, grouping, group operations, etc. For example, a group may be established for all objects that have a "Location" tag set to "Boston." As illustrated in FIG. 11, a group name 1172, here "BostonGroup", may be provided. The BostonGroup 1172 may be set up to include objects having a type 1173 (e.g., array), and attribute 1174 (e.g., tag name) having an operator or condition 1175 (e.g., contains) that meets a value 1176 (e.g., Boston). Accordingly, storage resource management objects may be identified by tag attribute (1635). The identified storage resource management objects then may be assigned to the group (1640). Operations then may be performed on the group of storage resource management objects (1645), instead of individual objects, which gives additional control to the storage resource management application user based on the name and/or value of tags associated with objects. It should be understood that the tags may be stored with the objects in the storage resource management application.

Figure 12:
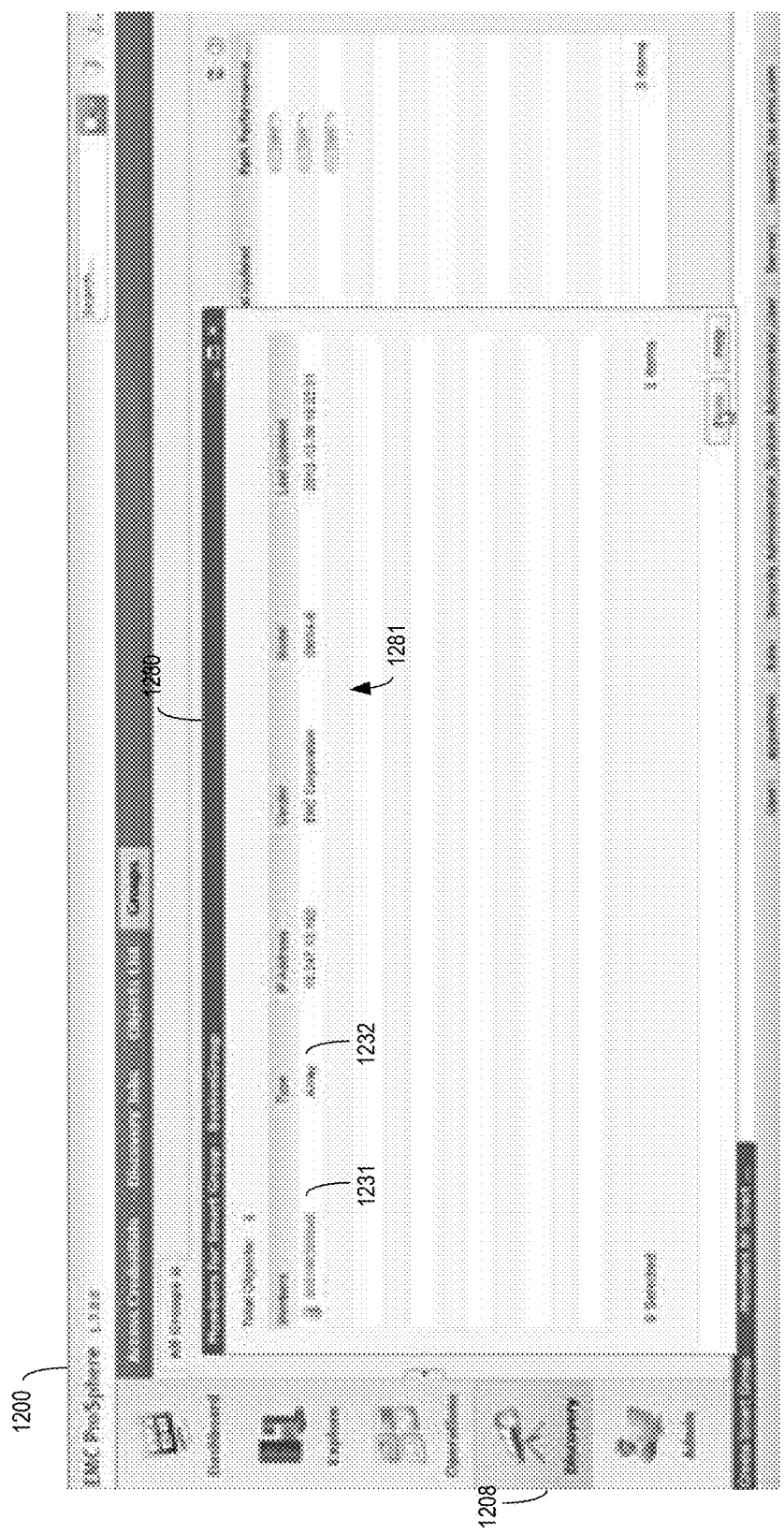
FIG. 12 is a screen shot of an object group member list of a discovery pane of a storage resource management application according to an example embodiment of the present invention.

FIG. 12 is a screen shot of an object group member list 1280 of a discovery pane 1208 of a storage resource management application 1200 according to an example embodiment of the present invention. As illustrated in FIG. 12, the object group member list 1280 lists all objects 1281 in the newly created BostonGroup, including the member name 1231 and type 1232 of the object.

Figure 13:
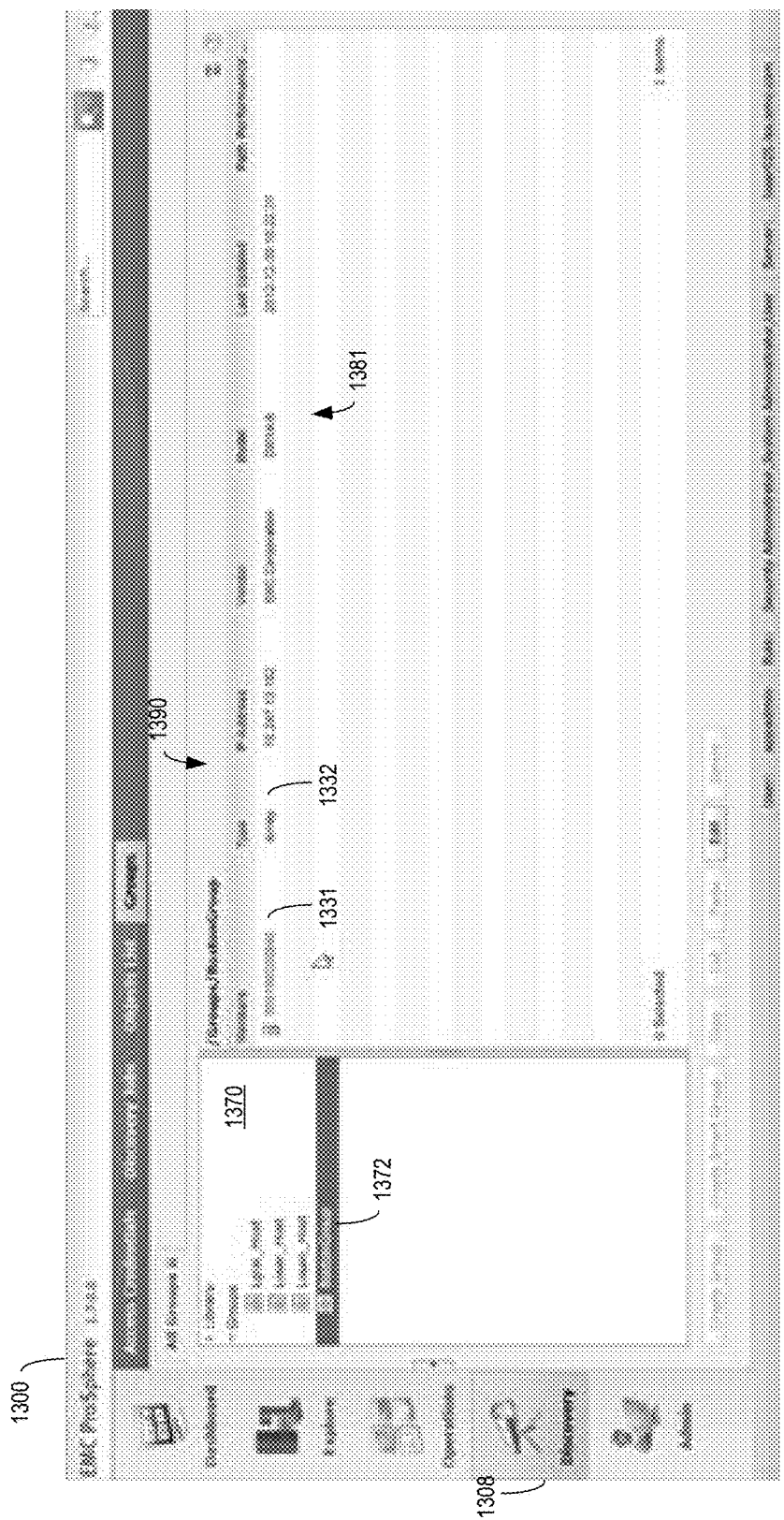
FIG. 13 is a screen shot of an object group management pane of a storage resource management application showing object groups according to an example embodiment of the present invention.

FIG. 13 is a screen shot of an object group management screen 1390 of a discovery pane 1308 of a storage resource management application 1300 showing object groups 1370 according to an example embodiment of the present invention. As illustrated in FIG. 13, a user may select the BostonGroup 1372 from the list of groups 1370. Accordingly, the object group management screen 1390 may display a list 1381 of objects in the group (e.g., Boston Group). Similar to FIG. 12, the object group management screen 1390 lists all objects 1381 in the selected group (e.g., BostonGroup 1372), including the member name 1331 and type 1332 of the object.

Figure 17:
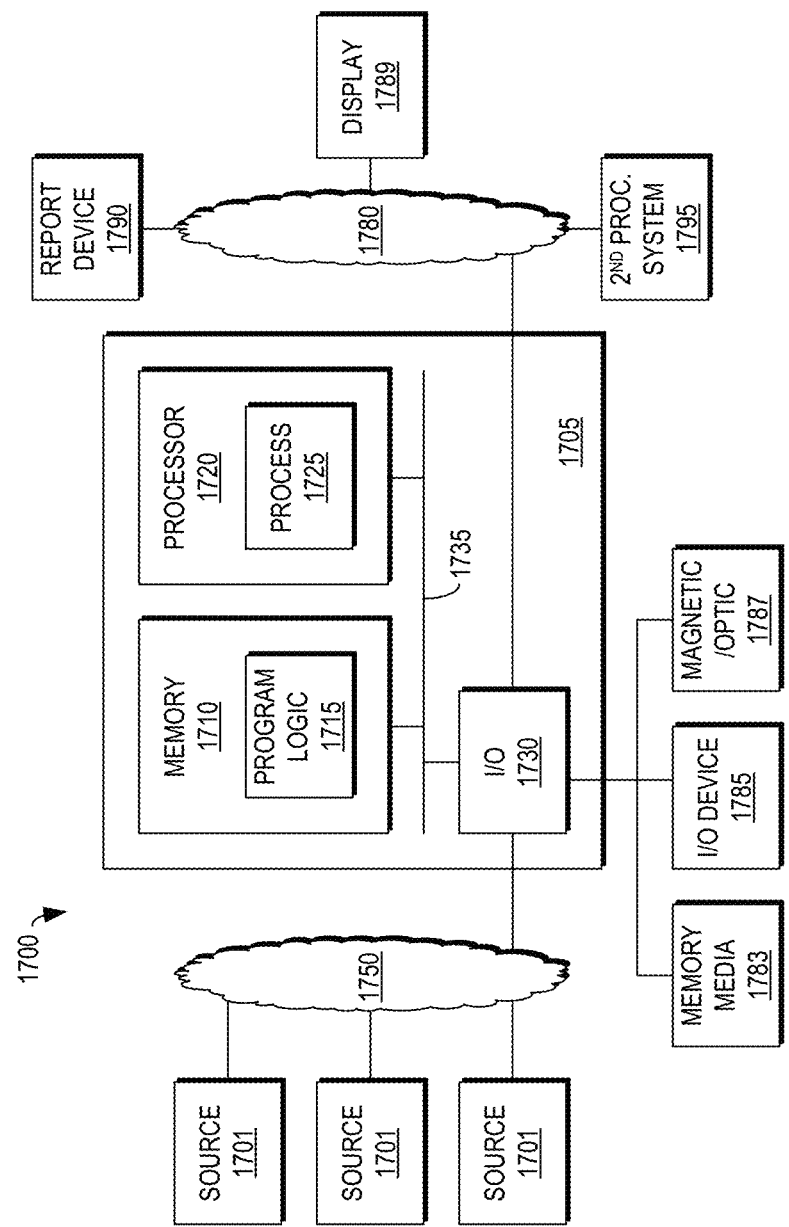
FIG. 17 is a block diagram illustrating an apparatus according to an example embodiment of the present invention.

FIG. 17 is a block diagram of an example embodiment apparatus 1705 according to the present invention. The apparatus 1705 may be part of a system 1700 and includes memory 1710 storing program logic 1715, a processor 1720 for executing a process 1725, and a communications I/O interface 1730, connected via a bus 1735. The I/O interface 1730 may provide connectivity to memory media 1783, I/O device 1785, and drives 1787, such as magnetic or optical drives. The apparatus 1705 is configured to communicate with a plurality of sources 1701 via a network 1750 using the I/O interface 1730. The apparatus 1705 is further configured to communicate with a display 1789, a report device 1790, and a second processing system 1795 via a network 1780 using the I/O interface 1730.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 17, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 18:
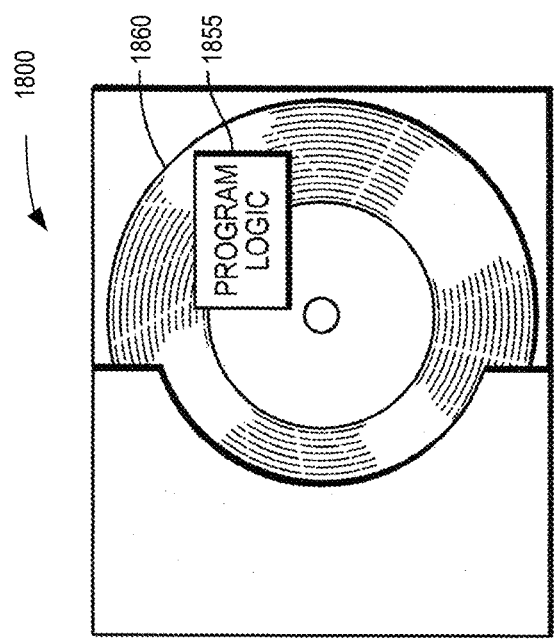
FIG. 18 is an illustration of an apparatus as embodied in program code according to an example embodiment of the present invention.

FIG. 18 shows program logic 1855 embodied on a computer-readable medium 1860 as shown, and wherein the logic 1855 is encoded in computer-executable code configured for carrying out the gas controlling process of this invention, thereby forming a computer program product 1800.

The logic for carrying out the method may be embodied as part of the aforementioned system, which is useful for carrying out a method described with reference to embodiments shown in, for example, FIGS. 1-16. For purposes of illustrating the present invention, the invention is described as embodied in a specific configuration and using special logical arrangements, but one skilled in the art will appreciate that the device is not limited to the specific configuration but rather only by the claims included with this specification.

Embodiments of the present invention have been described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:
   receiving an identification of at least a first storage resource management object deployed in a network infrastructure in a storage resource management application;
   receiving at least a first user-defined tag name;
   in response to receiving the first user-defined tag name, creating a tag with the first user-defined tag name enabled to have one or more user-defined tag values, wherein the first user-defined tag name and the one or more user-defined tag values, relative to the deployment of the first storage resource management object in the network infrastructure, are unrelated to predefined attributes, characteristics, and properties of storage resource management objects deployed in the network infrastructure;
   assigning the tag to the first storage resource management object;
   specifying one or more of the predefined attributes, characteristics, and properties;
   selecting the first user-defined tag name and at least a given user-defined tag value associated with the first user-defined tag name;
   identifying particular ones of the storage resource management objects deployed in the network infrastructure, including the first storage resource management object and at least a second storage resource management object, that have the specified one or more predefined attributes, characteristics, and properties, that are assigned the tag having the first user-defined tag name, and that have the given user-defined tag value;
   assigning the identified storage resource management objects to a given group;
   determining whether respective ones of the storage resource management objects in the given group support group operations by evaluating one or more of the user-defined tag values for the storage resource management objects in the given group; and
   performing a group operation on any of the storage resource management objects in the given group that are determined to support group operations;
   wherein the network infrastructure comprises a cloud infrastructure comprising a plurality of datacenters connected to one another and to a central management location, and the given user-defined tag value comprises a federated tag value configured:
to be set to a first value for storage resource management objects in the plurality of datacenters that are to be managed by the central management location; and
to be set to a second value for storage resource management objects in the plurality of datacenters that are to be managed locally by corresponding ones of the plurality of datacenters; and wherein the storage resource management application is configured:
to replicate and maintain consistency of data at the central management location for storage resource management objects in the plurality of datacenters having the federated tag value set to the first value; and
to refrain from replicating and maintaining consistency of data at the central management location for storage resource management objects in the plurality of datacenters having the federated tag value set to the second value.

2. The method of claim 1 wherein assigning the tag to the first storage resource management object comprises associating the tag with the first storage resource management object for use with the storage resource management application thereby enabling additional control over the first storage resource management object by a user of the storage resource management application.

3. The method of claim 1 wherein assigning the tag to the first storage resource management object comprises selecting at least one tag value for association with the first storage resource management object.

4. The method of claim 1 further comprising performing at least one additional operation on each of one or more of the storage resource management objects according to its corresponding tag, the at least one additional operation comprising one or more of: searching, filtering, and performing management operations.

5. The method of claim 1 further comprising providing an interface for input and output of storage resource management object data and tag data.

6. An apparatus comprising:
a processor; and
memory storing computer program code that, when executed on the processor, causes the apparatus to provide a storage resource management application, the computer program code including computer program code for:
receiving an identification of at least a first storage resource management object deployed in a network infrastructure in the storage resource management application;
receiving at least a first user-defined tag name;
in response to receiving the first user-defined tag name, creating a tag with the first user-defined tag name enabled to have one or more user-defined tag values, wherein the first user-defined tag name and the one or more user-defined tag values, relative to the deployment of the first storage resource management object in the network infrastructure, are unrelated to predefined attributes, characteristics, and properties of storage resource management objects deployed in the network infrastructure;
assigning the tag to the first storage resource management object;
specifying one or more of the predefined attributes, characteristics, and properties;
selecting the first user-defined tag name and at least a given user-defined tag value associated with the first user-defined tag name;
identifying particular ones of the storage resource management objects deployed in the network infrastructure, including the first storage resource management object and at least a second storage resource management object, that have the specified one or more predefined attributes, characteristics, and properties, that are assigned the tag having the first user-defined tag name, and that have the given user-defined tag value;
assigning the identified storage resource management objects to a given group;
determining whether respective ones of the storage resource management objects in the given group support group operations by evaluating one or more of the user-defined tag values for the storage resource management objects in the given group; and
performing a group operation on any of the storage resource management objects in the given group that are determined to support group operations;

wherein the network infrastructure comprises a cloud infrastructure comprising a plurality of datacenters connected to one another and to a central management location, and the given user-defined tag value comprises a federated tag value configured:
to be set to a first value for storage resource management objects in the plurality of datacenters that are to be managed by the central management location; and
to be set to a second value for storage resource management objects in the plurality of datacenters that are to be managed locally by corresponding ones of the plurality of datacenters; and wherein the storage resource management application is configured:
to replicate and maintain consistency of data at the central management location for storage resource management objects in the plurality of datacenters having the federated tag value set to the first value; and
to refrain from replicating and maintaining consistency of data at the central management location for storage resource management objects in the plurality of datacenters having the federated tag value set to the second value.

7. The apparatus of claim 6 further comprising computer program code for associating the tag with the first storage resource management object for use with the storage resource management application enabling additional control over the first storage resource management object by a user of the storage resource management application.

8. The apparatus of claim 6 further comprising computer program code for performing at least one additional operation on each of one or more of the storage resource management objects according to its corresponding tag, the at least one additional operation comprising one or more of: searching, filtering, and performing management operations.

9. The apparatus of claim 6 further comprising an interface for input and output of storage resource management object data and tag data.

10. A computer program product including a non-transitory computer-readable storage medium encoded with computer program code that, when executed on a processor of a computer, causes the computer to tag a storage resource management object, the computer program product comprising:

computer program code for receiving an identification of at least a first storage resource management object deployed in a network infrastructure in a storage resource management application;

computer program code for receiving at least a first user-defined tag name;

computer program code for in response to receiving the first user-defined tag name, creating a tag with the first user-defined tag name enabled to have one or more user-defined tag values, wherein the first user-defined tag name and the one or more user-defined tag values, relative to the deployment of the first storage resource management object in the network infrastructure, are unrelated to predefined attributes, characteristics, and properties of storage resource management objects deployed in the network infrastructure;

computer program code for assigning the tag to the first storage resource management object;

computer program code for specifying one or more of the predefined attributes, characteristics, and properties;

computer program code for selecting the first user-defined tag name and at least a given user-defined tag value associated with the first user-defined tag name;

computer program code for identifying particular ones of the storage resource management objects deployed in the network infrastructure, including the first storage resource management object and at least a second storage resource management object, that have the specified one or more predefined attributes, characteristics, and properties, that are assigned the tag having the first user-defined tag name, and that have the given user-defined tag value;

computer program code for assigning the identified storage resource management objects to a given group;

computer program code for determining whether respective ones of the storage resource management objects in the given group support group operations by evaluating one or more of the user-defined tag values for the storage resource management objects in the given group; and computer program code for performing a group operation on the storage resource management objects in the given group that are determined to support group operations;

wherein the network infrastructure comprises a cloud infrastructure comprising a plurality of datacenters connected to one another and to a central management location, and the given user-defined tag value comprises a federated tag value configured:
to be set to a first value for storage resource management objects in the plurality of datacenters that are to be managed by the central management location; and
to be set to a second value for storage resource management objects in the plurality of datacenters that are to be managed locally by corresponding ones of the plurality of datacenters; and wherein the storage resource management application is configured:
to replicate and maintain consistency of data at the central management location for storage resource management objects in the plurality of datacenters having the federated tag value set to the first value; and
to refrain from replicating and maintaining consistency of data at the central management location for storage resource management objects in the plurality of datacenters having the federated tag value set to the second value.

11. The method of claim 1 wherein the first storage resource management object comprises at least one of a host, a switch, a port, an array, and a logical unit deployed in the network infrastructure.

12. The method of claim 1 wherein the tag assigned to the first storage resource management object comprises a tag attribute specifying update date and time information for the tag.

13. The method of claim 1 wherein assigning the tag to the first storage resource management object comprises utilizing an application programming interface of the storage resource management application to import information associated with the storage resource management objects deployed in the network infrastructure.

14. The method of claim 13 wherein importing the information associated with the storage resource management objects deployed in the network infrastructure comprises importing a comma separated value file comprising management information associated with the storage resource management objects deployed in the network infrastructure.

15. The method of claim 1 wherein the storage resource management application comprises a graphical user interface providing storage resource management object configuration interface features, the storage resource management object configuration features comprising a first interface feature for displaying a network topology map showing one or more of the storage resource management objects deployed in the network infrastructure and at least a second interface feature for managing tags assigned to the storage resource management objects in the displayed network topology map.

16. The apparatus of claim 6 wherein the storage resource management application comprises a graphical user interface providing storage resource management object configuration interface features, the storage resource management object configuration features comprising a first interface feature for displaying a network topology map showing one or more of the storage resource management objects deployed in the network infrastructure and at least a second interface feature for managing tags assigned to the storage resource management objects in the displayed network topology map.

17. The computer program product of claim 10 wherein the storage resource management application comprises a graphical user interface providing storage resource management object configuration interface features, the storage resource management object configuration features comprising a first interface feature for displaying a network topology map showing one or more of the storage resource management objects deployed in the network infrastructure and at least a second interface feature for managing tags assigned to the storage resource management objects in the displayed network topology map.

18. The apparatus of claim 6 wherein assigning the tag to the first storage resource management object comprises utilizing an application programming interface of the storage resource management application to import information associated with the storage resource management objects deployed in the network infrastructure.

19. The apparatus of claim 18 wherein importing the information associated with the storage resource management objects deployed in the network infrastructure comprises importing a comma separated value file comprising management information associated with the storage resource management objects deployed in the network infrastructure.

20. The computer program product of claim 10 wherein assigning the tag to the first storage resource management object comprises utilizing an application programming interface of the storage resource management application to import information associated with the storage resource management objects deployed in the network infrastructure.

21. The computer program product of claim 10 wherein importing the information associated with the storage resource management objects deployed in the network infrastructure comprises importing a comma separated value file comprising management information associated with the storage resource management objects deployed in the network infrastructure.

\* \* \* \* \*